(12) United States Patent
Plee et al.

(10) Patent No.: US 9,409,118 B2
(45) Date of Patent: Aug. 9, 2016

(54) CARBON OXIDE CAPTURE

(75) Inventors: Dominique Plee, Lima (PE); Georges Fremy, Sauveterre de Bearn (FR)

(73) Assignee: ARKEMA FRANCE, Colombes (FR)

( * ) Notice: Subject to any disclaimer, the term of this patent is extended or adjusted under 35 U.S.C. 154(b) by 525 days.

(21) Appl. No.: 13/879,872

(22) PCT Filed: Oct. 18, 2011

(86) PCT No.: PCT/FR2011/052424
§ 371 (c)(1),
(2), (4) Date: May 28, 2013

(87) PCT Pub. No.: WO2012/052671
PCT Pub. Date: Apr. 26, 2012

(65) Prior Publication Data
US 2013/0312607 A1    Nov. 28, 2013

(30) Foreign Application Priority Data
Oct. 18, 2010 (FR) ...................... 10 58454

(51) Int. Cl.
*B01D 53/14* (2006.01)
*C01B 3/52* (2006.01)
*C10K 1/16* (2006.01)
*C10K 1/18* (2006.01)
*B01D 53/62* (2006.01)

(52) U.S. Cl.
CPC ........ *B01D 53/1475* (2013.01); *B01D 53/1493* (2013.01); *C01B 3/52* (2013.01); *C10K 1/16* (2013.01); *C10K 1/18* (2013.01); *B01D 53/62* (2013.01); *B01D 2252/2025* (2013.01); *B01D 2252/504* (2013.01); *B01D 2258/0283* (2013.01); *C01B 2203/0415* (2013.01); *C01B 2203/0475* (2013.01); *Y02C 10/04* (2013.01); *Y02C 10/06* (2013.01); *Y02P 20/152* (2015.11); *Y02P 30/30* (2015.11)

(58) Field of Classification Search
CPC combination set(s) only.
See application file for complete search history.

(56) References Cited

U.S. PATENT DOCUMENTS 2,649,166 A * 8/1953 Eck ...................... B01D 95/166
                                                                 D53/62
4,561,869 A * 12/1985 Gazzi ................. B01D 53/1456
                                                                 62/635
4,979,966 A    12/1990 Rojey

FOREIGN PATENT DOCUMENTS

EP    0362023 A1 * 4/1990    ......... B01D 53/1456

OTHER PUBLICATIONS

International Search Report received in PCT/FR2011/052424, mailed Feb. 14, 2012.

* cited by examiner

*Primary Examiner* — Christopher P Jones
*Assistant Examiner* — Adam W Bergfelder
(74) *Attorney, Agent, or Firm* — Smith, Gambrell & Russell, LLP

(57) ABSTRACT

The present invention relates to the use of (poly)-oxymethylene dialkyl ethers as agents for capturing carbon oxides, CO and/or $CO_2$.
The invention also relates to the process for capturing carbon oxides using at least one absorption agent chosen from said (poly)oxymethylene dialkyl ethers.

16 Claims, No Drawings

CARBON OXIDE CAPTURE

The invention relates to the field of capturing carbon oxides, and in particular the field of capturing carbon dioxide or $CO_2$. More particularly, the invention relates to the field of capturing carbon oxide molecules, particularly $CO_2$, contained in a gas stream in order, inter alia, to store this $CO_2$ in underground reservoirs, with a view to combating the effects of global warming.

The invention is particularly suitable for the recovery of carbon oxides, preferably carbon dioxide, when they are recovered from a gas at a pressure above atmospheric pressure. Such a gas is typically a syngas produced by gasification of coal or by reforming of natural gas, which may or may not be followed by a reaction known as the water-gas shift reaction.

Carbon oxides, and in particular carbon dioxide, are removed from the gases in question with a view either to using the hydrogen as fuel or with a view to using a mixture of carbon monoxide and hydrogen, either for synthesizing methanol, or for manufacturing fuels, or for any other usage where syngas is used.

$CO_2$ makes up the composition of greenhouse gases (GHGs), which it now appears highly likely are involved in global warming. The Kyoto protocol commits signatory developed countries to reduce their GHG emissions by 5.2% on average over the period 2008-2012. According to the Intergovernmental Panel on Climate Change (IPCC), global emissions should be reduced by more than half by 2050.

The content of $CO_2$ in the atmosphere, which was 280 ppm at the beginning of the $19^{th}$ century, is 370 ppm today with an increase of 60 ppm in the last 50 years. Today, the atmosphere contains around 700 Gt of $CO_2$.

$CO_2$ remains in the atmosphere over a long period of time. It slowly dissolves in the oceans and contributes to their acidification. It is estimated that between 30% and 50% of all the $CO_2$ emitted by anthropogenic emissions have been trapped by the oceans.

The combustion of fossil energy (coal, oil and gas) in transportation, the production of electricity and industry and also housing, are the main sources of releases of $CO_2$ into the atmosphere with 25 billion tonnes per year on a global scale. By way of example, a thermal power plant can release up to 6 million tonnes of $CO_2$/year.

Capturing $CO_2$ at the source of large electricity production sites and heavy industry sites in order to store it constitutes, on a global scale, one of the most promising research pathways for meeting the Kyoto criteria. An IPCC report also acknowledges that these technologies are a means of partly solving the problem of climate change.

This is even truer since coal reserves are estimated at several hundreds of years, whereas oil reserves are numbered rather in tens of years. Coal, used for example in thermal power plants, nevertheless has the drawback of releasing more $CO_2$ per kWh than methane, namely around 750 g of $CO_2$ per kWh. Lastly, the number of projects that could be put in place by 2020 is estimated at around one hundred.

Regarding the existing technologies for capturing $CO_2$, three technological routes are in competition, but correspond to various temperature and pressure conditions of the processes:

The first route is post-combustion, which consists in removing the $CO_2$ from the combustion gases released in the stack. The gases that escape from a thermal power plant consist of nitrogen, $CO_2$ and impurities of NOx or $SO_2$ type. The $CO_2$ content is from 12% to 15% for a coal-fired power plant and from 6 to 8% for a gas-fired power plant. In certain chemical processes, such as the manufacture of cement, the $CO_2$ content may rise up to 30%. The pressure of these gaseous effluents is close to atmospheric pressure.

The objective of post-combustion capture is to extract the dilute $CO_2$ and it may be integrated into existing installations, by means of a redesign of the whole of the unit. However, integrating a $CO_2$ recovery section into an existing unit does not constitute optimum technology and the best way of reducing the recovery energy costs consists of an overall integration considered from the start of the installation project. Post-combustion is currently the best controlled method.

The second possible route is pre-combustion, the objective of which is to capture the $CO_2$ during the process of manufacturing the fuel. The fuel (coal, gas, and biomass) is converted into a mixture of carbon monoxide and hydrogen. The technique used is either steam reforming in the presence of water, or partial oxidation in the presence of oxygen. The CO, present in the mixture, reacts with the water to form $CO_2$ and hydrogen (reaction known as water-gas shift reaction). The $CO_2$, present at contents from 25% to 40%, is then separated from the hydrogen which may be used to produce energy without emission of $CO_2$.

The third route, oxy-fuel combustion, uses pure oxygen as oxidant. This technology is not strictly speaking $CO_2$ capture. It involves producing a concentrated flue gas containing 90% $CO_2$ by carrying out a combustion using virtually pure oxygen. With recycling of a portion of the $CO_2$ in replacement for nitrogen from the air, oxy-fuel combustion requires the boilers and burners to be redefined. Another sizable obstacle is the price of oxygen. Oxy-fuel combustion is a technique that is still at the demonstration stage.

Chemical absorption is the most commonly used process in post-combustion. Chemical absorption consists of capturing $CO_2$ using a chemical solvent, which generally comprises amines. Indeed, the use of amines has been known for a long time in gas deacidification. Thus natural gases rich in $H_2S$ and/or $CO_2$ are treated.

The expression "chemical solvent" is understood to mean a solvent which has a strong chemical interaction (reactivity) and a high affinity with $CO_2$. One of the drawbacks of these solvents is that their heat of reaction is high and that their regeneration consequently requires a lot of energy (typically heating at 120° C.). In compensation, the affinity is high.

In a conventional process for recovering $CO_2$ using chemical absorption in post-combustion, the flue gases to be treated are sent to an absorber, in which they are mixed with a chemical solvent. Having greater affinity with the $CO_2$ molecules than with the other components of the flue gases (especially nitrogen), the solvent captures the $CO_2$ (it is referred to as an "enriched" solvent) and the other molecules are released from the absorber (treated flue gases).

Almost 90% of the $CO_2$ of the flue gases is thus captured by the solvent. The enriched solvent is then sent to a regenerator. The device is heated at 120° C., in order to break the bonds between the $CO_2$ and the solvent. The $CO_2$ is then isolated, then transported to its storage site. The solvent, returned to its initial form (referred to as "depleted" solvent) is reinjected into the absorber with the flue gases to be treated.

There are three categories of amines capable of constituting a chemical solvent: primary, secondary and tertiary amines. Monoethanolamine (MEA) is more reactive than the more sterically hindered amines (the secondary or tertiary amines) and for this reason dominates the market. The hindered amines used are 2-amino-2-methyl-1-propanol (AMP) or 2-piperidineethanol (PE), which have a weaker interaction with $CO_2$ and may be easier to regenerate ("Performance and cost analysis for $CO_2$ capture from flue gas streams: absorption and regeneration aspects", Veawab, A. et al., (2002), Sixth International Conference on Greenhouse Gas Control Technologies, Kyoto, C4-5).

Another type of hindered amines, KS1 amines, developed by EXXON are used in a urea plant in Malaysia ("Development and Applications of flue gas carbon dioxide recovery", Mimura, T. et al., (2000), 5th International Conference on Greenhouse Gas Control Technologies, CAIRNS CSIRO, Pub. ISBN 0 643 06672 1).

The main concerns with amines lie in their boiling point which, if it is too low, causes a lot of solvent to be lost which it is then necessary to recover. The problems of corrosion, degradation and oxidation in the presence of oxygen, $SO_2$ or $NO_2$ are also drawbacks of the chemical absorption process using amines.

Finally, the energy for regenerating chemical solvents is high and may represent up to 80% of the energy of the process for capturing $CO_2$ ("Separation and Capture of $CO_2$ from large stationary sources and sequestration in geological formations", White C. M., et al., (2003), J. of the Air and Waste Management Association, 53, p. 645-715).

Apart from the amines, certain inorganic compounds may be used as chemical solvents. Thus, for example, the Banfield process consists in trapping $CO_2$ with potassium or sodium salts. Use is conventionally made of potassium carbonate in solution at 20-40% and pressures of 2 MPa to 3 MPa. The main drawback of these inorganic compounds is that they may salt out sodium and/or potassium into the gas produced.

Ammonia also makes it possible to trap $CO_2$. In particular, it is capable of capturing more $CO_2$ per kg of active material and of having an easier regeneration than MEA ("Ammonia process for Simultaneous reduction of $CO_2$, $SO_2$ and $NO_x$", Yeh, J. T., et al., $19^{th}$ Annual International Pittsburgh Coal Conference, Pittsburgh, (2002), Paper 45-1). Ammonia nevertheless poses problems due to its volatility.

In pre-combustion, physical absorption is the best way of recovering the $CO_2$, considering the very different pressures (which may range from 2.5 MPa to 50 MPa) relative to those observed in post-combustion.

Physical absorption uses physical solvents. The expression "physical solvent" is understood to mean a solvent which has a moderate chemical interaction with $CO_2$. The drawbacks and advantages are the opposite of those of chemical solvents. In physical absorption, the capacity of the solvent follows Henry's law for ideal gas mixtures whereas in chemical absorption, the capacity of the solvent is not linear with the pressure ("Gas cleaning for Advanced coal based power generation", Thambimuthu, K., (1993), IEA Coal Research, London Report No. IEACR/53). It is thus understood that physical absorption is more suitable for "high pressure" processes.

The choice of a technology therefore depends on numerous factors: partial pressure of $CO_2$, percentage of $CO_2$ to be recovered, temperature, sensitivity to impurities, presence of particles, cost of additives for minimizing corrosion and fouling, etc.

As examples of physical solvents, mention may be made of methanol (Rectisol®), N-methylpyrrolidone (Purisol®) and polyethylene glycol dimethyl ether) (Selexol®). The Rectisol® process by Lurgi uses methanol at −40° C. and the number of recompression stages for the regeneration is high; this makes this process highly energy consuming.

Reference is made to hybrid absorption for the processes that combine chemical and physical solvents. The Sulfinol® process by Shell and Amisol® process by Lurgi are known, which respectively use a mixture of sulfolane, DIPA and water (one variant replaces DIPA with MDEA) and a mixture of methanol and MEA or DEA. The advantage of hybrid processes is revealed when the gas to be treated is at high pressure.

Indeed, the substitution, under these conditions, of a portion of the chemical solvent with a physical solvent makes it possible to globally reduce the energy costs of the regeneration without drastically reducing the absorption capacity. Nevertheless, even reduced, the energy costs of regenerating a hybrid solvent are significantly higher (depending on the amount of chemical solvent in the mixture) than for a pure physical solvent.

The main challenge in order for the storage to be deployed on a large scale consists in reducing the energy consumption of the processes. Thus, within the context of the European Castor project, an experiment is being carried out in Denmark in order to attempt to reduce the capture cost to below 30 euros/tonne.

Apart from the energy expenditure, other technical difficulties may appear, such as oxidation of solvent, corrosion of installations, losses of vapor phase, which are the main points accounting for the cost of recovering $CO_2$ today. All these problems necessitate the use of numerous additives.

It is therefore clear that the large-scale deployment of capturing processes depends strongly on all these considerations. Indeed, in the best of cases, the capture, transport and storage of one tonne of $CO_2$ costs between 60 and 70 euros, of which 70% to 80% are dedicated to the capture phase. Due to their high investment cost, the techniques for capturing $CO_2$ are more suitable for large concentrated emission sources than for sources of low flow (thermal power plants, cement works, refineries, plants for producing fertilizer, iron and steel mills, and petrochemical plants where the production of $CO_2$ is concentrated).

In the case of chemical absorption by amines or mixtures of amines, an efficient unit equipped with $CO_2$ capture must respect certain energy limits. European regulation requires that the amount of energy released must not exceed 2 million kilojoules (heating at 120° C.) per tonne of $CO_2$ captured.

The technique using chilled ammonia would make it possible to recover 90% of the $CO_2$ from the flue gases, but it consumes around 10% of the energy produced in order to chill the ammonia and to subsequently separate it from the $CO_2$.

The case of absorption by physical solvents currently used also has drawbacks. By way of example, the Rectisol process uses methanol at highly negative temperatures under high pressures: the energy involved originates from thermal and pressure variations between regeneration and absorption.

Certain solvents from the prior art have a high viscosity which leads to higher energy costs for the circulation of the solvent and makes the regeneration step more difficult by slowing down the velocity of the gas at desorption.

All these considerations show that the field of capturing carbon oxides, and in particular $CO_2$, remains a field where technical progress is essential.

One objective of the present invention is therefore to provide a process for capturing carbon oxides, carbon monoxide and/or dioxide, in particular $CO_2$, that makes it possible to respond to a large number of these drawbacks, using solvents that have greater capacities for absorbing said carbon oxides, accelerated absorption kinetics, a high boiling point, a low vapor pressure and a moderate viscosity, inter alia.

According to a preferred aspect, one objective of the present invention is a process for capturing and/or recovering carbon dioxide ($CO_2$) contained in a gas stream. More specifically, one objective of the present invention is a process for capturing carbon monoxide and/or dioxide, preferably $CO_2$, contained in a gas stream, in which the gas stream is brought into contact with a solvent.

The expression "gas stream" is understood to mean the combustion flue gases or any gas and/or vapor emission, generally produced by an industrial installation.

The gas stream is typically a gas mixture containing CO and/or $CO_2$, and which may also contain, non-limitingly, nitrogen, hydrogen, oxygen, hydrogen sulfide, sulfur dioxide, steam, etc.

By way of example, the process of the invention relates to the recovery of CO and/or $CO_2$, preferably $CO_2$, contained in a gas with a pressure higher than atmospheric pressure. Such a gas is typically a syngas produced by coal gasification ($C+H_2O \leftrightarrow CO+H_2$) or by reforming of natural gas ($CH_4+H_2O \leftrightarrow CO+3H_2$), followed by a "water-gas shift reaction" ($CO+H_2+H_2O \leftrightarrow 2H_2+CO_2$). The carbon dioxide should, for example, be removed from the gas obtained, with a view to using the hydrogen as fuel.

The Applicant has now discovered that the aforementioned objectives are achieved completely, or at least partly, using organic compounds of polyoxy-methylene dialkyl ether or POM type, as agents for trapping carbon oxides, in particular $CO_2$.

POM compounds are known, but for different uses. For example, French patent FR 2 881 750 describes a use of POMs as fuels for fuel cells. Patent EP 1 938 684 and international application WO 2010/001048 describe a use of POMs in the field of embalming.

The capture (or trapping) of carbon oxides according to the invention is advantageously based on the absorption principle which is based on the transfer of carbon oxides into a solvent comprising one or more organic compounds of (poly)oxymethylene dialkyl ether type.

Thus, and according to a first aspect, the present invention relates to the use, as an agent for trapping carbon oxides, in particular $CO_2$, of at least one compound of formula (1) below:

$$X—(OCR_2)_n—OX' \quad (1)$$

in which:
n is an integer between 1 and 20, preferably between 1 and 8, limits included,
X and X', which are identical or different, represent, independently of one another, a $C_mH_{2m+1}$ radical with m between 1 and 20, preferably between 1 and 10, limits included, and
R represents hydrogen or X.

Within the context of the present invention, the expression "(poly)oxymethylene dialkyl ethers" encompasses the compounds of formula (1) above, and more specifically oxymethylene dialkyl ethers when n is equal to 1 and polyoxymethylene dialkyl ethers when n is strictly greater than 1.

In the compounds of formula (1) above, the R radicals may be identical or different. When R represents X, that is to say represents $C_mH_{2m+1}$, the values of m that are very particularly preferred are those between 1 and 10, more preferably between 1 and 6, limits included.

According to one preferred embodiment of the invention, the X and X' radicals are identical. According to another embodiment of the invention, R represents H. According to one very particularly preferred embodiment, the invention relates to the use, as an agent for trapping carbon oxides, of at least one compound of formula $X—(OCH_2)_n—OX$, where X and n are as defined previously.

The compounds of formula (1) are known and may be easily prepared from methanol and formaldehyde, itself produced from methanol, or from the trimer of formaldehyde, trioxane.

More generally, the work by J. F. Walker, "Formaldehyde", Robert E. Krieger Publishing Company, Huntington, N.Y., 3rd Edition from 1975 is a reference work on the subject. Indeed, it is possible to find therein the description of the methods of synthesis on pages 167 et seq., on the one hand, and 264 et seq., on the other hand. These methods of synthesis are based on an acid catalysis of the reaction of an alcohol (methanol or ethanol) or of an acetal (methylal or ethylal) with formol or an equivalent compound. This type of synthesis is also illustrated in numerous patents such as U.S. Pat. No. 2,449,469 or JP 47-40772.

U.S. Pat. No. 6,350,919 describes the synthesis of symmetrical polyoxymethylene dialkyl ether type compounds with an either methyl or ethyl alkyl group.

Other methods of synthesis based on a catalysis of Lewis acid type have also been described. Mention may be made of patent GB 1 120 524 which describes the synthesis of stable polyoxymethylene diethers with ionic catalysts of Lewis acid type.

According to one preferred embodiment, the synthesis of the compounds of formula (1) is carried out without solvent, by acid catalysis of a mixture containing trioxane and an acetal, using, for example, an acid resin; the Amberlyst® A15 grade is one of the effective catalysts. The reaction temperatures are generally between 20 and 80° C., preferably between 40 and 50° C. and the reaction preferably takes place at atmospheric pressure.

The trioxane/acetal molar ratio is generally of the order of 0.75. Generally, the product resulting from the synthesis comprises a relatively large distribution of the subscript n of the methylene groups. Separation by distillation makes it possible to recover a "light" fraction and a "heavy" fraction.

When methylal is used, the polyoxymethylene/MM is manufactured where M represents the methyl groups and when ethylal is used, the polyoxymethylene/EE is produced where E represents the ethyl groups. Of course, mixtures of acetals are possible, in which case the products formed will contain mixtures that it is possible to separate by distillation.

Assymetric POMs, that is to say those corresponding to the general formula (1), where X and X' are different, are obtained either by direct synthesis according to the processes targeted above, or by transacetalization of two different symmetrical (X and X' identical) POMs.

Methylal or dimethoxymethane represents the first member of the compounds of formula (1), where n is equal to 1, and corresponds to the formula $CH_3—O—CH_2—OCH_3$. Polyoxymethylene dimethyl ethers correspond to the formula $CH_3—(OCH_2)_n—OCH_3$, where n is as defined previously, apart from the value 1.

Other nonlimiting examples of compounds of formula (1) are (poly)oxymethylene diethyl ethers, (poly)oxymethylene dipropyl ethers, (poly)oxymethylene dibutyl ethers, for the symmetrical compounds of formula (1) (X and X' are identical), and (poly)oxy-methylene methyl ethyl ethers ($CH_3—(OCH_2)_n—OC_2H_5$, for example for the asymmetric compounds of formula (1) (X and X' are different).

According to one advantageous embodiment, the invention targets the use of at least one compound chosen from $CH_3—(OCH_2)—OCH_3$, $CH_3—(OCH_2)_2—OCH_3$, $CH_3—(OCH_2)_3—OCH_3$, $CH_3—(OCH_2)_4—OCH_3$, $CH_3—(OCH_2)_5—OCH_3$, $CH_3—(OCH_2)_6—OCH_3$, $CH_3—(OCH_2)_7—OCH_3$, $CH_3—(OCH_2)_8—OCH_3$, $C_2H_5—(OCH_2)—OC_2H_5$, $C_2H_5—(OCH_2)_2—OC_2H_5$, $C_2H_5—$ $(OCH_2)_3$—$OC_2H_5$, $C_2H_5$—$(OCH_2)_4$—$OC_2H_5$, $C_2H_5$—$(OCH_2)_5$—$OC_2H_5$, $C_2H_5$—$(OCH_2)_6$—$OC_2H_5$, $C_2H_5$—$(OCH_2)_7$—$OC_2H_5$, $C_2H_5$—$(OCH_2)_8$—$OC_2H_5$, $C_4H_9$—$(OCH_2)$—$OC_4H_9$, $CH_3$—$(OCH_2)$—$OC_2H_5$, 1,1,2,2-tetraethoxyethane, 1,1,3,3-tetraethoxypropane, 1,1,3,3-tetramethoxypropane, and mixtures thereof in any proportions, very preferably chosen from $CH_3$—$(OCH_2)$—$OCH_3$, $CH_3$—$(OCH_2)_2$—$OCH_3$, $C_2H_5$—$(OCH_2)$—$OC_2H_5$, $C_4H_9$—$(OCH_2)$—$OC_4H_9$, 1,1,2,2-tetraethoxyethane, 1,1,3,3-tetraethoxypropane, 1,1,3,3-tetramethoxypropane, and mixtures thereof in any proportions.

According to another embodiment, it is preferred to use, for the requirements of the invention, at least one compound of formula (1) as defined previously, in which n is an integer between 2 and 20, preferably between 2 and 8, limits included.

The compounds of formula (1) defined above for which n is strictly greater than 1 are compounds that are perfectly suitable due to their high boiling point. Indeed, as indicated previously, it is preferred, for the requirements of the invention, to use a compound having a high boiling point, more specifically a boiling point above 50° C. and more preferably above 100° C.

In yet another preferred embodiment, the invention relates to the use of at least one symmetrical compound of formula (1) (that is to say X and X' are identical). According to another preferred embodiment, the invention targets the use of a mixture of compounds of formula (1), in which X represents the methyl radical or the ethyl radical and n is between 2 and 8, limits included.

According to one even more preferred embodiment, the invention targets the use of at least one compound of formula (1) which is a mixture of compounds of formula $CH_3$—$(OCH_2)_n$—$OCH_3$ with n between 2 and 8, limits included, the composition of which is the following (the percentages are expressed in moles):

| | | | n | | | |
|---|---|---|---|---|---|---|
| 2 | 3 | 4 | 5 | 6 | 7 | 8 |
| 25-50 % | 20-40 | 10-25 | 5-10 | 2-5 | <2 | <1 |

More particularly, one preferred composition for the use of the present invention is a mixture of compounds of formula $CH_3$—$(OCH_2)_n$—$OCH_3$ with n between 2 and 8, limits included, the composition of which is the following (the percentages are expressed in moles):

| | | | n | | | |
|---|---|---|---|---|---|---|
| 2 | 3 | 4 | 5 | 6 | 7 | 8 |
| 44 % | 32 | 14 | 6 | 2.5 | 1 | <1 |

According to yet another preferred embodiment, the invention targets the use of a mixture of compounds of formula $C_2H_5$—$(OCH_2)_n$—$OC_2H_5$ with n between 1 and 8, limits included, the composition of which is the following:

| | | | n | | | | |
|---|---|---|---|---|---|---|---|
| 1 | 2 | 3 | 4 | 5 | 6 | 7 | 8 |
| 58 % | 26 | 10 | 4 | 1.5 | <1 | <1 | <1 |

The compounds of formula (1) or the mixtures of compounds of formula (1) such as have just been defined, may be used alone or as mixtures with one or more solvents.

As a general rule, the compound or compounds of formula (1) are present in an amount varying from 0.1% by weight to 99% by weight, relative to the total weight of the mixture of the compound or compounds of formula (1) with at least one solvent.

As nonlimiting examples of solvents which may be used within the context of the present invention, mention may be made of linear alcohols, preferably linear alcohols, ketones, polyethylene glycols, sulfur-containing solvents, such as for example sulfolane, nitrogen-containing solvents, such as for example N-methylpyrrolidone, etc.

According to another aspect, the present invention relates to a process for capturing carbon oxides, for example CO and/or $CO_2$, preferably $CO_2$, comprising at least one step of bringing a gas stream comprising at least one carbon oxide into contact with at least one compound of formula (1) as defined previously.

Before this contacting step, the gas stream is optionally subjected to a pretreatment, for example to remove one or more of the compounds, other than the carbon oxides, that are present in the gas stream.

Advantageously, and before being subjected to a capture of CO and/or $CO_2$ according to the process of the invention, said gas stream has a content of carbon oxides, such as CO and/or $CO_2$, within the range extending from 1% to 100% by volume, preferably from 1% to 90% by volume, or more preferably from 1% to 50% by volume, at a temperature within the range extending from −40° C. to 100° C., preferably from 20° C. to 80° C., and under a pressure within the range extending from 0.1 MPa to 8 MPa, preferably from 0.1 MPa to 5 MPa.

According to one embodiment of the invention, the process for capturing carbon oxides is carried out in an absorption column at a temperature within the range extending from −40° C. to 100° C., preferably from 20° C. to 80° C. The pressure in the column is within the range extending from 0.1 MPa to 8 MPa, preferably from 0.1 MPa to 5 MPa.

By way of example of the column, use may be made of any type of column, such as a perforated plate column, valve column, bubble-cap column, column with random packing or column with structured packing.

According to one preferred embodiment of the capturing process according to the invention, the [compound of formula (1)/carbon oxide] ratio, at 0.1 MPa and 25° C., is advantageously between 0.1 and 0.33 kg of compound of formula (1) per NTP liter of carbon oxide, for example of $CO_2$. More preferably, this ratio is between 0.10 and 0.20 kg of compound of formula (1) per NTP liter of $CO_2$.

According to the process of the present invention, the capture of carbon oxides takes place by physical absorption of said carbon oxides, that is to say that there is no chemical reaction between said carbon oxides and the physical absorption solvent (the compounds of formula (1)). The regeneration of the solvent according to the invention is thus facilitated.

Unexpectedly, the Applicant has observed that the compounds of formula (1) are capable of absorbing carbon oxides and, in particular, $CO_2$, remarkably well and according to a purely physical mechanism. Furthermore, these compounds have boiling points that are high enough to be compatible with processes for capturing carbon oxides, and in particular $CO_2$, are chemically more stable than amines and result in no, or very few, corrosion phenomena.

The process of the invention advantageously uses at least one compound of formula (1), preferably chosen from $CH_3$—$(OCH_2)_{2-8}$—$OCH_3$, $CH_3$—$(OCH_2)_{2-4}$—$OCH_3$ and $CH_3$—$(OCH_2)_{4-8}$—$OCH_3$.

The process of the invention thus makes it possible to capture the carbon oxides included in a gaseous stream, and thus results in an adsorbate (or "enriched solvent") comprising at least one compound of formula (1) defined previously and at least one carbon oxide, carbon monoxide and/or dioxide, preferably carbon dioxide.

According to yet another aspect, the invention also relates to the process for regenerating the enriched solvent which comprises at least one step of reducing the pressure of the enriched solvent, preferably to atmospheric pressure, and/or at least one step of increasing the temperature of the enriched solvent to a temperature below 100° C., and more preferably still below 50° C.

According to one preferred embodiment, the step of regenerating the enriched solvent is carried out by pressure reduction of the solvent, in particular if the carbon oxide capturing pressure (absorption pressure) is greater than 0.1 MPa. This regeneration via expansion is conventionally carried out, for example by passing the enriched solvent into a flash drum.

Thus, on the one hand, a gas mixture very rich in carbon oxides (the content of which depends on the selectivity of the solvent with respect to the other compounds of the gas stream to be treated) and, on the other hand, a solvent depleted in carbon oxides, the residual content of which depends on the expansion pressure, are obtained.

If necessary, the gas mixture rich in carbon oxides and/or the solvent depleted in carbon oxides may be subjected to one or more new regeneration steps via pressure reduction and/or increase in temperature.

According to yet another aspect, the present invention targets a continuous process for capturing carbon oxides, CO and/or $CO_2$ in particular, comprising alternately and consecutively:
- at least one step of bringing a gas stream comprising at least one carbon oxide into contact with at least one compound of formula (1) as defined previously, as a solvent for absorbing said carbon oxide, and
- at least one step of regenerating the absorption solvent, as defined previously, by reducing the pressure of the enriched solvent and/or increasing the temperature of the enriched solvent.

In the above process, the regenerated solvent is again used in a carbon oxide absorption (capturing) step, then regenerated, and so on.

This continuous process may thus advantageously be integrated into an industrial unit producing large amounts of carbon oxides, which may thus be captured and stored, rather than being released into the atmosphere. The process of the invention thus makes it possible to effectively participate in the reduction of the emissions of carbon oxides responsible in particular for global warming.

The examples below illustrate the invention without however limiting the scope thereof defined by the appended claims.

EXAMPLE 1

Synthesis of Polyoxymethylene/MM 2-8 (DMPOM 2-8)

Introduced into a jacketed 500 ml round-bottomed flask, equipped with a condenser, a stirrer and a temperature probe, were 100 g of methylal, 30 g of trioxane and 5 g of Amberlyst® A15 resin. The whole mixture was brought to 50° C. and maintained at this temperature for one hour.

The reaction mixture was then washed with 10 g of a 15% by weight solution of sodium hydroxide, and the residual methylal was recovered in the rotary evaporator flask under 200 hPa and at 90° C. Next, via distillation, 32 g of polyoxymethylene/MM with n between 2 and 8 were obtained.

EXAMPLE 2

Synthesis of DMPOM 2-4 and DMPOM 4-8

The product resulting from example 1 was cut via distillation so as to obtain a fraction centered on a "light" product $CH_3$—$(OCH_2)_{2-4}$—$OCH_3$ and a "heavy" fraction centered on $CH_3$—$(OCH_2)_{4-8}$—$OCH_3$.

EXAMPLE 3

Test for Capturing $CO_2$ Using Methylal

Introduced into a jacketed steel 1 L reactor, equipped with a temperature probe, with a connection to a vacuum pump and with a connection to a 1 L ballast containing 10 bar absolute of pressure of $CO_2$, provided with a discharge valve and with a finely graduated manometer, were 250 g of methylal.

The solvent was first degassed by putting the reactor under vacuum (<10 mmHg), so as to expel as much of the air initially present in the installation as possible and, optionally, that degassed from the solvent owing to the drop in pressure.

While keeping the solvent under vacuum with the reactor sealed, the temperature was set at 25° C. and $CO_2$ was introduced while regulating the discharge valve so as to maintain 1 bar absolute in the reactor containing the solvent. As soon as the solvent started to be stirred, a drop in pressure corresponding to the solubilization of the $CO_2$ was observed. The $CO_2$ originated from the ballast, in which the initial pressure was 20.0 bar absolute.

When the solvent was saturated with $CO_2$, the pressure in the ballast no longer decreased and the final pressure achieved was noted. Knowing the difference in pressure in the ballast ($P_{initial}$–$P_{final}$) the volume of the ballast, the empty volume (without solvent) of the installation, the volume of solvent and also the pressure and temperature in the reactor, the volume of $CO_2$ solubilized by the solvent was deduced therefrom by applying the ideal gas law.

Once the measurement was made under a pressure of 1 bar, the pressure was gradually increased in stages and new measurements were taken up to a pressure of 15 bar. The curve of the solubility of the $CO_2$ (in normal liters of gas per kg of pure solvent) as a function of the pressure of $CO_2$ is regressed passing through the origin and the lineas coefficient thus obtained is reported in table 1.

EXAMPLE 4

Test for Capturing $CO_2$ Using DMPOM 2-8

Example 3 was reproduced replacing the 250 g of methylal with 250 g of the product obtained in example 1 that is referred to as DMPOM 2-8. The results are reported in table 1.

EXAMPLE 5

Test for Capturing $CO_2$ Using DMPOM 2-4

Example 3 was reproduced replacing the 250 g of methylal with 250 g of the product obtained in example 2 that is referred to as DMPOM 2-4. The results are reported in table 1.

EXAMPLE 6

Test for Capturing $CO_2$ Using DMPOM 4-8

Example 3 was reproduced replacing the 250 g of methylal with 250 g of the product obtained in example 2 that is referred to as DMPOM 4-8. The results are reported in table 1.

TABLE 1

| Temperature (° C.) | Pressure (CO$_2$) (Bar) | Example 3 CH$_3$OCH$_2$OCH$_3$ methylal NL/kg | Example 4 CH$_3$O(CH$_2$O)$_{2-8}$CH$_3$ DMPOM 2-8 NL/kg | Example 5 CH$_3$O(CH$_2$O)$_{2-4}$CH$_3$ DMPOM 2-4 NL/kg | Example 6 CH$_3$O(CH$_2$O)$_{4-8}$CH$_3$ DMPOM 4-8 NL/kg |
|---|---|---|---|---|---|
|  | 0 | 0 | 0 | 0 | 0 |
| 25 | 1 | 8.0 | 6.0 | 7.3 | 5.3 |
| 25 | 3 | 24.1 | 17.9 | 22.3 | 16.1 |
| 25 | 6 | 47.8 | 35.8 | 44.4 | 31.6 |
| 25 | 9 | 71.5 | 54.2 | 66.8 | 47.5 |
| 25 | 15 | 121.0 | 93.0 | 111.2 | 79.7 |
| Solubility = f(P$_{CO2}$) linear regression coefficient |  | 8.0 NL/kg/bar | 6.0 NL/kg/bar | 7.4 NL/kg/bar | 5.3 NL/kg/bar |

It is readily observed in the tests from examples 3 to 6 that the CO$_2$ solubilities are higher the lower the average molecular weight. It is also observed that perfect straight lines are obtained between the amount of CO$_2$ absorbed and the pressure.

EXAMPLE 7 (COMPARATIVE)

Test for Capturing CO$_2$ Using NMP

Example 3 was reproduced replacing the 250 g of methylal with 250 g of N-methylpyrrolidone (NMP). The results are reported in table 2.

EXAMPLE 8 (COMPARATIVE)

Test for Capturing CO$_2$ Using DMSO

Example 3 was reproduced replacing the 250 g of methylal with 250 g of dimethylsulfoxide (DMSO). The results are reported in table 2.

EXAMPLE 9 (COMPARATIVE)

Test for Capturing CO$_2$ Using Tetraline

Example 3 was reproduced replacing the 250 g of methylal with 250 g of tetrahydronaphthalene (tetraline). The results are reported in table 2.

EXAMPLE 11 (COMPARATIVE)

Test for Capturing CO$_2$ Using DMTriEG

Example 3 was reproduced replacing the 250 g of methylal with 250 g of triethylene glycol dimethyl ether (DMTRiEG). The results are reported in table 3.

EXAMPLE 12 (COMPARATIVE)

Test for Capturing CO$_2$ Using DMTetraEG

Example 3 was reproduced replacing the 250 g of methylal with 250 g of tetraethylene glycol dimethyl ether (DMTetraEG). The results are reported in table 3.

EXAMPLE 13 (COMPARATIVE)

Test for Capturing CO$_2$ Using DMPEG 150

Example 3 was reproduced replacing the 250 g of methylal with 250 g of poly(ethylene glycol dimethyl ether) having an average molecular weight of 150 g/mol (DMPEG 150). The results are reported in table 3.

TABLE 2

| Temperature (° C.) | Pressure (CO$_2$) (Bar) | Example 3 CH$_3$OCH$_2$OCH$_3$ methylal NL/kg | Example 4 CH$_3$O(CH$_2$O)$_{2-8}$CH$_3$ DMPOM 2-8 NL/kg | Example 7 Comparative NMP NL/kg | Example 8 Comparative DMSO NL/kg | Example 9 Comparative Tetraline NL/kg |
|---|---|---|---|---|---|---|
|  | 0 | 0 | 0 | 0 | 0 | 0 |
| 25 | 1 | 8.0 | 6.0 | 4.3 | 3.3 | 2.50 |
| 25 | 3 | 24.1 | 17.9 | 12.6 | 10.1 | 8.00 |
| 25 | 6 | 47.8 | 35.8 | 25.2 | 19.7 | 15.90 |
| 25 | 9 | 71.5 | 54.2 | 37.6 | 30 | 22.90 |
| 25 | 15 | 121.0 | 93.0 | 63.1 | 49.7 | 38.70 |
| Solubility = f(P$_{CO2}$) linear regression coefficient |  | 8.0 NL/kg/bar | 6.0 NL/kg/bar | 4.2 NL/kg/bar | 3.3 NL/kg/bar | 2.6 NL/kg/bar |

Compared to the conventional physical solvents from comparative examples 7 to 9, it is observed that the POM derivatives according to the invention display substantially greater solubilities.

EXAMPLE 10 (COMPARATIVE)

Test for Capturing CO$_2$ Using DMDEG

Example 3 was reproduced replacing the 250 g of methylal with 250 g of diethylene glycol dimethyl ether (DMDEG). The results are reported in table 3.

EXAMPLE 14 (COMPARATIVE)

Test for Capturing CO$_2$ Using DMPEG 250

Example 3 was reproduced replacing the 250 g of methylal with 250 g of poly(ethylene glycol dimethyl ether) having an average molecular weight of 250 g/mol (DMPEG 250). The results are reported in table 3.

TABLE 3

| Temperature (° C.) | Pressure ($CO_2$) (Bar) | Example 5 $CH_3O(CH_2O)_{2-4}CH_3$ DMPOM2-4 NL/kg | Example 10 Comparative DMDEG NL/kg | Example 11 Comparative DMTriEG NL/kg | Example 12 Comparative DMTetraEG NL/kg | Example 13 Comparative $DMPEG_{150}$ NL/kg | Example 14 Comparative $DMPEG_{250}$ NL/kg |
|---|---|---|---|---|---|---|---|
| | 0 | 0 | 0 | 0 | 0 | 0 | 0 |
| 25 | 1 | 7.3 | 5.1 | 4.3 | 3.5 | 4.0 | 2.8 |
| 25 | 3 | 22.3 | 15.8 | 12.1 | 11.1 | 12.5 | 8.9 |
| 25 | 6 | 44.4 | 31.6 | 24.2 | 22.0 | 23.4 | 17.9 |
| 25 | 9 | 66.8 | 46 | 37.5 | 33.1 | 37.1 | 26.5 |
| 25 | 15 | 111.2 | 78.2 | 60.4 | 55.8 | 59.9 | 42.2 |
| Solubility = $f(P_{CO2})$ linear regression coefficient | | 7.4 NL/kg/bar | 5.2 NL/kg/bar | 4.1 NL/kg/bar | 3.7 NL/kg/bar | 4.0 NL/kg/bar | 2.9 NL/kg/bar |

In the family of dimethyl ethylene glycols, the better solubility of $CO_2$ in compounds having lower molecular weights is also observed. However, it is observed that the compound from the POM family according to the invention, DMPOM2-4 (molecular weight 152 g/mol) gives better results than DMDEG (molecular weight 134 g/mol).

Therefore, and without being tied to any theory, the Applicant believes that the O—C—O—C alternations are more effective than the O—C—C—O alternations.

It is also observed that, having the same number of repeat units, the POMs (according to the invention) always give better results than the diethylene glycols (DEGs).

Moreover, it is noted that the POMs have a viscosity lower than those of the DEGs, which forms a considerable advantage from the energy viewpoint in applications for capturing carbon oxides, in particular $CO_2$.

The invention claimed is:

1. A process for capturing carbon oxides, comprising at least one step of bringing a gas stream comprising at least one carbon oxide into contact with a trapping agent comprising at least one compound of formula (1) as follows:

$$X—(OCR_2)_n—OX' \quad (1)$$

wherein
n is an integer between 2 and 20, limits included,
X and X' may be identical or different and represent a $C_mH_{2m+1}$ radical with m between 1 and 20, limits included, and
R represents hydrogen or the $C_mH_{2m+1}$ radical with m between 1 and 20, limits included.

2. The process of claim 1, wherein the gas stream has a content of carbon oxides within the range extending from 1% to 100% by volume.

3. The process of claim 1, wherein the ratio of the compound of formula (1) to the carbon oxide is between 0.1 and 0.33 kg per liter at 25° C. under 0.1 MPa.

4. The process of claim 1, wherein at least one compound of formula. (1) is selected from the group consisting of (i) $CH_3$—$(OCH_2)_n$—$OCH_3$, where n is an integer between 2 and 8, limits included, (ii) $CH_3$—$(OCH_2)_n$—$OCH_3$, where n is an integer between 2 and 4, limits included, and (iii) $CH_3$—$(OCH_2)_n$—$OCH_3$, where n is an integer between 4 and 8, limits included.

5. The process of claim 1, wherein the trapping agent is at least one compound of formula (1), where the X and X' radicals are identical.

6. The process of claim 1, wherein the trapping agent is at least one compound of formula (1) where the R radicals represent a hydrogen atom.

7. The process of claim 1, wherein the trapping agent is at least one compound of formula X—$(OCH_2)_n$—OX, where X and n are as defined in claim 1.

8. The process of claim 1, wherein the trapping agent is at least one compound selected from the group consisting of $CH_3$—$(OCH_2)_2$—$OCH_3$, $CH_3$—$(OCH_2)_3$—$OCH_3$, $CH_3$—$(OCH_2)_4$—$OCH_3$, $CH_3$—$(OCH_2)_5$—$OCH_3$, $CH_3$—$(OCH_2)_6$—$OCH_3$, $CH_3$—$(OCH_2)_7$—$OCH_3$, $CH_3$—$(OCH_2)_8$—$OCH_3$, $C_2H_5(OCH_2)_2$—$OC_2H_5$, $C_2H_5$—$(OCH_2)_3$—$OC_2H_5$, $C_2H_5$—$(OCH_2)_4$—$OC_2H_5$, $C_2H_5$—$(OCH_2)_5$—$OC_2H_5$, $C^2H_5$—$(OCH_2)_6$—$OC_2H_5$, $C_2H_5$—$(OCH_2)_7$—$OC_2H_5$, $C_2H_5$—$(OCH_2)_8$—$OC_2H_5$, and mixtures thereof in any proportions.

9. The process of claim 1, wherein the at least one compound of formula (1) may be used alone or as a mixture with one or more solvents.

10. The process of claim 1, wherein n is from 2 to 8.

11. The process of claim 1, wherein m is from 1 to 10.

12. The process of claim 1, wherein the carbon oxide is CO and/or $CO_2$.

13. The process of claim 12, wherein the carbon oxide is $CO_2$.

14. The process as defined in claim 2, wherein the content of carbon oxides ranges from 1 to 90% by volume.

15. The process of claim 14, wherein the content of carbon oxides ranges from 1 to 50% by volume.

16. A continuous process for capturing carbon oxides, CO and/or $CO_2$, comprising alternately and consecutively:
at least one step of bringing a gas stream comprising at least one carbon oxide into contact with at least one compound of formula (1) as defined in claim 1, as a solvent for absorbing said carbon oxide, and
at least one step of regenerating the absorption solvent by reducing the pressure of the enriched solvent and/or increasing the temperature of the enriched solvent.

* * * * *